G. A. ANDERSON.
STEERING MECHANISM.
APPLICATION FILED MAR. 22, 1911.
1,025,604.
Patented May 7, 1912.
2 SHEETS—SHEET 1.
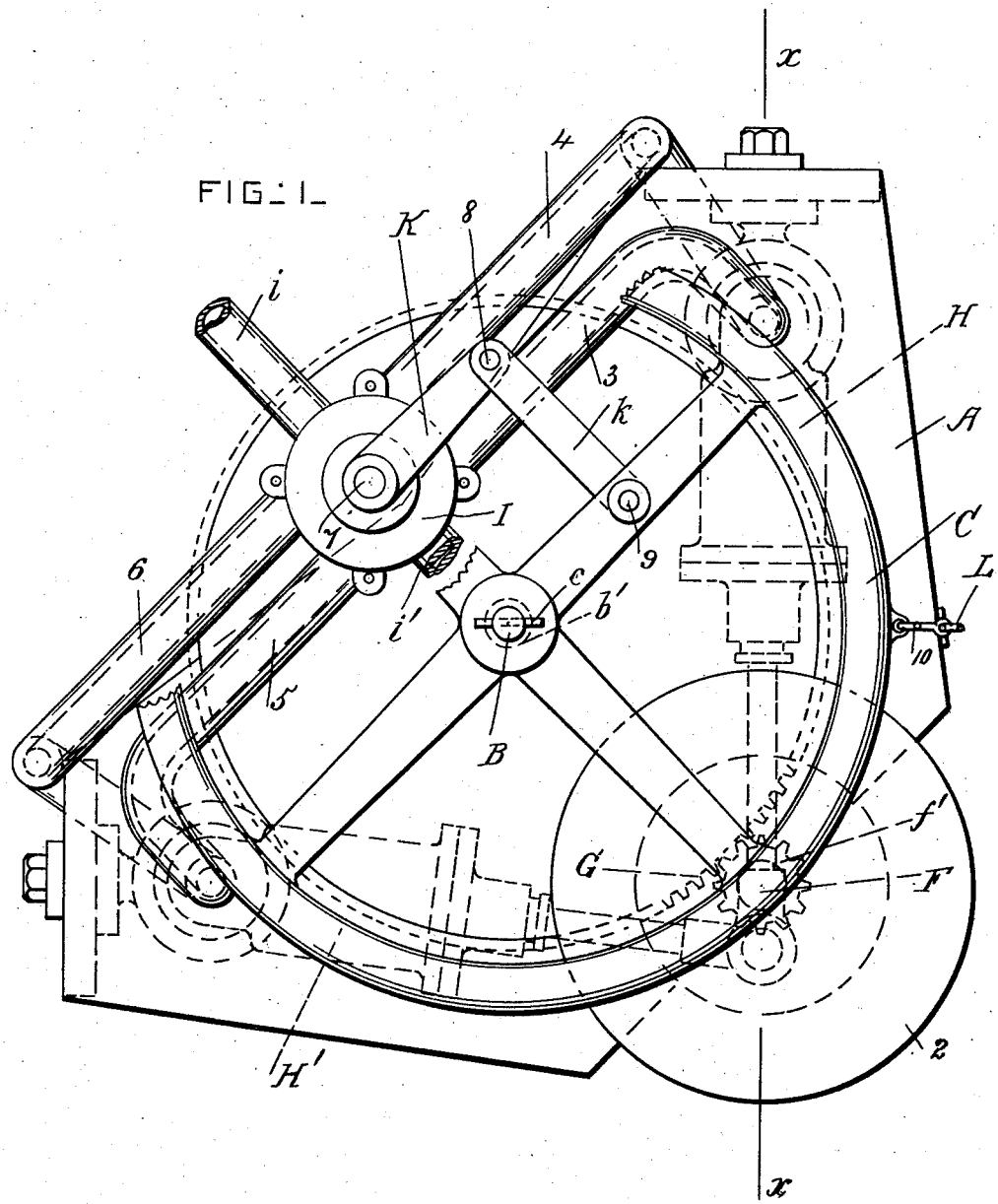
Witnesses
Inventor
Gustaf Arvid Anderson.
By
Attorney

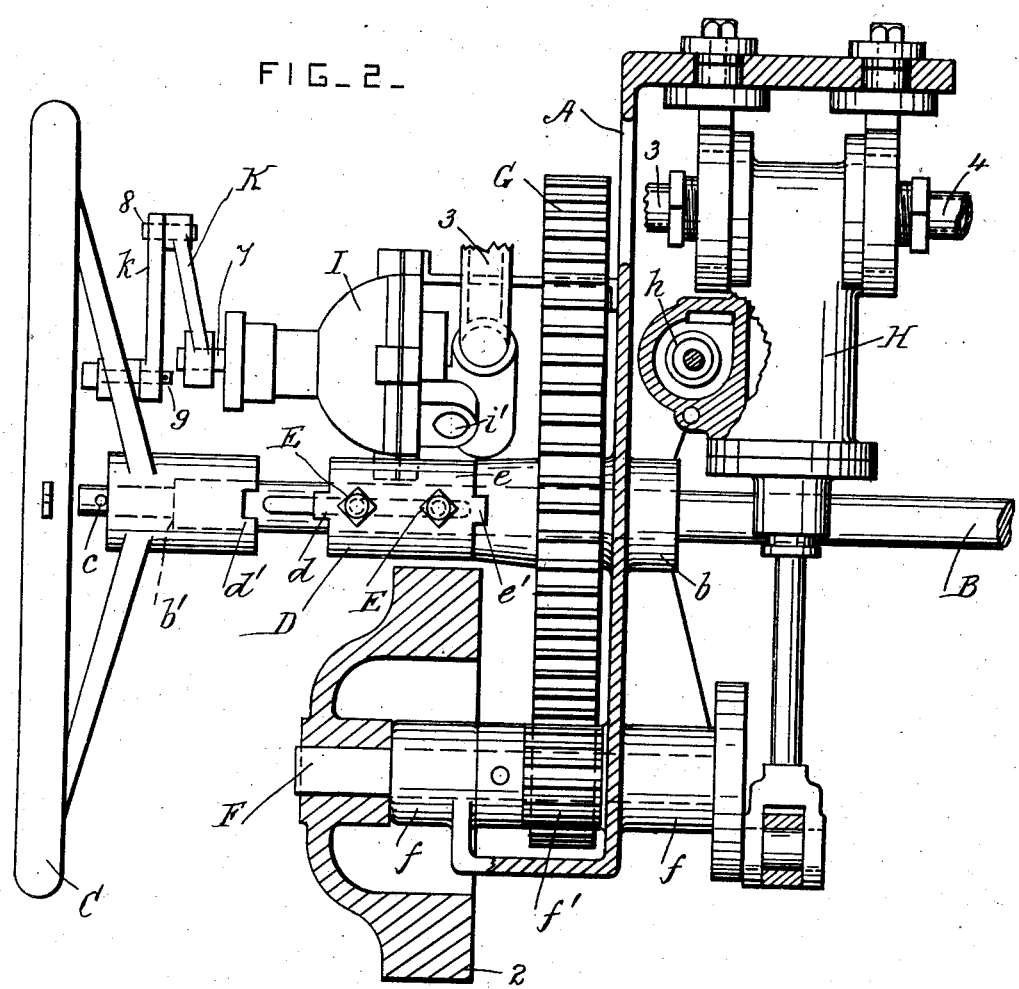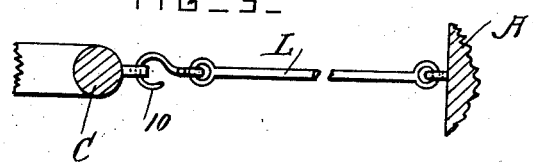

UNITED STATES PATENT OFFICE.

GUSTAF ARVID ANDERSON, OF WAYNESBORO, PENNSYLVANIA, ASSIGNOR TO THE GEISER MANUFACTURING COMPANY, OF WAYNESBORO, PENNSYLVANIA.

STEERING MECHANISM.

1,025,604.　　　Specification of Letters Patent.　　Patented May 7, 1912.

Application filed March 22, 1911. Serial No. 616,275.

*To all whom it may concern:*

Be it known that I, GUSTAF ARVID ANDERSON, a citizen of the United States, residing at Waynesboro, in the county of Franklin and State of Pennsylvania, have invented certain new and useful Improvements in Steering Mechanism; and I do hereby declare the following to be a full, clear, and exact description of the invention, such as will enable others skilled in the art to which it appertains to make and use the same.

This invention relates to steering mechanism specially adapted for use in connection with steam road rollers, but which may be used for other purposes.

This invention consists in the novel construction and combination of the parts hereinafter fully described and claimed whereby the steering shaft may be actuated by hand or by power at will.

In the drawings, Figure 1 is a plan view of the steering mechanism as constructed according to this invention. Fig. 2 is a section taken on the line $x$—$x$ in Fig. 1. Fig. 3 is a detail view of the flexible connection or stop.

A is a supporting frame, of any approved construction, which is secured to the main frame of the steam road roller in any convenient position.

B is the steering shaft which is journaled in a bearing $b$ on the frame A. One end portion of this steering shaft is operatively connected with the road wheel or wheels at the front end of the road roller, so that the road roller is adapted to be steered in either direction by revolving the shaft B one way or the other. The connections between the shaft B and the road wheels are not hereinafter more fully described as they do not form a part of the present invention.

C is a hand wheel for revolving the shaft B by hand and for controlling the motor. This hand wheel is journaled loose on the upper end portion of the shaft B, which shaft is reduced in size and provided with a shoulder $b'$ so that the hub of the hand wheel cannot slide down it. A pin $c$, or other fastening device, is provided at the top of the shaft B for keeping the hand wheel on the shaft.

D is a sleeve which is splined on the shaft B, and provided with a clutch member $d$ for engaging with a clutch member $d'$ on the hub of the hand wheel C.

E are set-screws, or other similar locking devices, for preventing the sleeve D from sliding longitudinally on the shaft B when the clutch members $d$ and $d'$ have been placed in engagement with each other.

F is the main driving shaft of the steam engine or other motor for revolving the shaft B by power instead of by means of the hand wheel. The shaft F is journaled in bearings $f$ on the frame A, and $f'$ is a toothed pinion which is secured on the shaft F.

G is a toothed wheel which is journaled loose on the shaft B and provided with a clutch member $e'$ on its hub for engaging with a clutch member $e$ on the sleeve D.

The steam engine is preferably provided with two oscillating cylinders H and H' arranged at a right angle to each other and pivoted to the frame A. The cylinders are operatively connected with the driving shaft F by means of pistons, piston-rods, and a crank. The cylinders are provided with similar steam distributing valves $h$, and a fly-wheel 2 is secured on the shaft F, but this fly-wheel may be omitted if desired.

I is a reversing valve for the engine, which is arranged to one side of the hand wheel, and provided with a steam supply pipe $i$ for connection to the steam boiler of the road roller. The reversing valve is also provided with an exhaust outlet or pipe $i'$.

3 and 4 are pipes which connect the valve I with the steam chest of the cylinder H; and 5 and 6 are pipes which connect the valve I with the steam chest of cylinder H'. The direction of the engine is reversed by oscillating the valve I, each pair of pipes serving for steam and exhaust, or exhaust and steam, according to the position of the valve I. Each pair of pipes is connected to the trunnions of the respective cylinders by means of suitable stuffing-boxes, and the pipes and the reversing valve are supported from the frame A in any approved manner. The reversing valve I also affords a means for starting and stopping the motor, and for regulating its speed, besides determining the direction of its revolution, and it is preferably a valve of the three-way type and of any approved construction.

K is a lever secured to the spindle 7 of the valve I, and $k$ is a link pivoted to the lever K by a pin 8 at one end, and provided with a pin 9 at its other end for connecting it to one of the arms of the hand wheel.

L is a stop comprising a flexible connection or chain secured to the frame A at one end, and provided with a hook 10 at its other end for engaging with a lug on the hand wheel. This stop chain is provided so as to limit the movement of the hand wheel in each direction, when the link k is connected to the hand wheel, so that the hand wheel can be used as a means for oscillating the valve I.

The valve I works under steam pressure so that it requires considerable force to move it, and the hand wheel and its connections afford a means for working the valve by hand with facility, and thereby controlling the motor. When the motor is not required in use the link k and the stop chain are disconnected from the hand wheel, and the hand wheel is connected direct to the steering shaft D, which is placed in engagement with its hub and secured by the set-screws.

The stop chain or cord L is detached by unhooking the hook 10 from the lug on the hand-wheel; and the link k is detached from the hand-wheel, to disconnect the valve I, by removing the connecting pin 9 which is provided with a head as shown so that it can be pulled out by hand. When thus disconnected the valve I is placed in a position to shut off steam from the cylinders, so that the motor remains stationary. The sleeve D is slid upwardly on the shaft into engagement with the hand-wheel, and the set-screws E are tightened to prevent the sleeve from slipping down the shaft. The steering mechanism is then operated manually by means of the hand wheel, which is at times necessary, for instance, if the motor should break down.

What I claim is:

1. The combination, with a frame, and a shaft journaled therein; of a hand wheel and a driving wheel each free to revolve on the said shaft and having clutch members on the adjacent ends of their hubs, a slidable sleeve splined to the said shaft and provided with a clutch member at each end whereby the shaft may be placed in driving engagement with either of the said wheels, a motor operatively connected with the said driving wheel, a valve controlling the said motor, and a disengageable connection between the said valve and the said hand wheel.

2. The combination, with a frame, of a shaft journaled in the frame, a hand wheel and a driving wheel each mounted loose on the said shaft, a motor operatively connected with the said driving wheel, a valve controlling the said motor and provided with an operating lever, a disengageable link pivotally connecting the valve lever with the hand wheel, a stop for limiting the movements of the hand wheel, and clutch mechanism carried by the said shaft and operating to place it in driving engagement with either of the two said wheels.

3. The combination, with a frame, a shaft journaled therein, a hand wheel and a driving wheel each free to revolve on the said shaft, and clutch mechanism for placing either wheel in driving engagement with the driving shaft; of a motor operatively connected with the said driving wheel, a valve controlling the said motor and having a valve-spindle arranged parallel to the said shaft, a lever secured on the valve-spindle, a disengageable link pivoted to the hand wheel and to the said lever, and a flexible connection arranged between the frame and the hand wheel and provided with a disengageable fastening device and adapted to limit the motion of the hand wheel.

4. The combination, with a frame provided with a bearing, and a shaft journaled in the bearing and having a reduced portion at its upper end which forms a shoulder; of a driving wheel mounted to revolve on the lower part of the said shaft with the lower end of its hub resting on the said bearing and having a clutch member on the upper end of its hub, a hand wheel mounted to revolve on the upper portion of the shaft and having a shoulder inside its hub which rests on the aforesaid shoulder and having also a clutch member on the lower end of its hub, a slidable sleeve splined to the said shaft and provided with a clutch member at each end, a set-screw engaging with the sleeve and adapted to engage the shaft to prevent the sleeve from sliding down the shaft by gravity, and a motor operatively connected with the said driving wheel.

In testimony whereof I have affixed my signature in the presence of two witnesses.

GUSTAF ARVID ANDERSON.

Witnesses:
 DANIEL S. BEARD,
 H. E. KUHNER.

---

Copies of this patent may be obtained for five cents each, by addressing the "Commissioner of Patents, Washington, D. C."